Patented Feb. 17, 1942

2,273,560

UNITED STATES PATENT OFFICE 2,273,560

METHOD OF COATING

William C. Calvert, Gary, Ind., assignor to Wingfoot Corporation, Wilmington, Del., a corporation of Delaware No Drawing. Original application November 4, 1933, Serial No. 696,687. Divided and this application November 20, 1940, Serial No. 366,439

2 Claims. (Cl. 229—3.5)

This invention relates to a method of coating a base, whether rigid or flexible, with a film of a rubber hydrochloride. Such a film is similar in appearance to cellulosic films such as Cellophane (a pure cellulose film) and Kodapak (a cellulose acetate film). It is, however, much more resistant to moisture than these films. The invention includes the method of coating the base and the product obtained.

According to this invention, a film is made of a rubber hydrochloride and this film is applied to the base. Rubber hydrochloride has valuable properties and may be used in a variety of ways. Films made of it are water-, acid-, alkali- and oil-resistant. It is thermoplastic and soften on heating and is very sticky in the softened state. It also becomes sticky when treated with a solvent such as benzene, chloroform, etc.

The invention has wide use in the water-proofing of flexible bases, such as papers and cloths, including such coarse-mesh cloth fabrics as cheese cloth, burlap, etc., and various felted materials, etc. By coating with a flexible coating material of rubber hydrochloride, a water-proofed sheet is obtained which may be used in wrapping or packaging various articles and in the manufacture of bags and other containers. A desirable form of container consists of a box-board base coated with a film of rubber hydrochloride. The invention affords a valuable method of protecting the surfaces of steel, wood and other rigid bases from the action of acids and alkalis. For example, a wooden tank may be lined with a film of a rubber hydrochloride to make it alkali resistant.

A rubber hydrochloride which is completely saturated with hydrogen chloride is brittle. A less saturated compound, such as a rubber hydrochloride containing from 28 to 30.5% chlorine, is quite flexible and may be creased without impairment of its properties. In coating a rigid base, the saturated rubber hydrochloride may be employed; but for coating a flexible base such as cloth or paper, the partially saturated flexible compound should be used. Rubber hydrohalides are unstable in the presence of light so it is usually advantageous to stabilize the same by the incorporation therein of a small amount of an age resister such as a mixture of 1½% of hexamethylene tetramine and 3% of di tetra hydro furfuryl amine or dicyclohexyl amine. Other age-resisters include diphenylguanidine, tetra methyl thiuram disulfide, dihydroxy diphenyl propane, methylene amino aceto nitrile, and mixtures of these compounds.

The rubber hydrochloride may be plasticized with waxes and oils. Fillers may be added as desired. Coloring matter may be incorporated and the rubber derivative may be dyed with soluble dyestuffs. Where desired, a mottled or other irregular finish may be imparted to the surface of the rubber derivative as by embossing the same with a heated die.

A thin film of rubber hydrochloride, e. g. a film .001 inch thick forms a satisfactory waterproof coating for paper and fabric. Thicker sheets may be used for waterproofing, acid-proofing, etc. The thickness of the sheet to be used will be determined by the strength of the base, the use to which the product is to be put and other factors. A thin flexible rubber hydrochloride film suitable for waterproofing paper, and for coating various materials for various purposes, may be made as follows:

Approximately 20 pounds of plasticized pale crepe rubber are dissolved in 313 pounds of benzene. Hydrogen chloride gas is introduced at about 10° C. until approximately 11.6 pounds of gas have been absorbed in the reaction mixture. This is allowed to stand until a rubber hydrochloride is produced which contains above 29.5% of chlorine, when the mass is steam distilled to remove the excess of free hydrogen chloride and to evaporate the solvent. The residue is then broken up on a rubber washer and washed thoroughly to remove any remaining hydrogen chloride and water soluble ingredients. The washed product is dried in a vacuum at approximately 160° F.

The dried product is dissolved in benzene or chloroform to produce a 4 to 8% solution of the rubber hydrochloride. It is advantageous to incorporate an age-resister in this solution. The solution is then spread as a thin film on a nitrocellulose-coated belt or other suitable surface and heated. After approximately 90% of the solvent has been evaporated, the film is removed from the belt, and with further heating the balance of the solvent is volatilized. The film thus produced is not sticky or tacky at ordinary temperatures, but softens at about 110 to 120° C. and will then adhere to itself, paper, cloth, wood, etc. Seams of packages are formed by heat-sealing the edges of the film together.

By pressing the film against paper, cloth or other fabric while heating to about this temperature, a flexible water-proof sheet is formed which may be used as a wrapping material or in any other desired way. The heating is advantageously accomplished by placing the fabric or other sheet on a heated plate and then rolling the film of the rubber derivative on to it. Or the thermoplastic film may be placed on an unheated table and covered with the fabric, etc. and the two may then be cemented together by rolling the fabric with a heated roll.

A two-ply fabric may be formed by pressing a film or thicker sheet of partially saturated rubber hydrochloride or other rubber hydrochloride between two pieces of fabric such as paper and cloth and heating both sides, or applying sufficient heat to one side to cause the rubber derivative to adhere to both pieces of the fabric and hold them together. Two sheets of paper or cloth may be fastened together in either of these ways. Similarly, a sheet of paper and piece of cloth may be formed into a laminated sheet, and paper or cloth may be caused to adhere to wood or steel or glass or other base.

Instead of applying the film with heat, the base may first be treated with a cement formed by dissolving rubber hydrochloride in a solvent such as benzol or chloroform and the film then pressed against the cemented surface of the base without heating. If preferred, the cement may be allowed to dry and the film, moistened with a solvent such as benzol, may be pressed against it with heating. As an alternative method, the base, after drying, and the film in its dry state may be pressed together with heating to form a bond between them.

It is intended that the patent shall cover by suitable expression in the appended claims whatever features of patentable novelty reside in the invention.

This application is a division of my application Serial No. 696,687 filed November 4, 1933, which is in part a continuation of my application Serial No. 652,686 filed January 20, 1933.

What I claim is:

1. A new article of manufacture for use as a material for forming a container comprising the combination of a sheet of paper, a layer of solvent-free thermoplastic resinous varnish superimposed thereupon and bonded thereto by a bond formed therebetween in the presence of solvent and an exposed superimposed preformed sheet-like thermoplastic medium mounted on the solvent-free surface of said varnish and adhesively adhering thereto, said thermoplastic medium being bonded to the solvent-free varnish layer by a bond formed therebetween under the action of heat but in the absence of solvent.

2. A new article of manufacture for use as a material for forming a container comprising the combination of a sheet of paper, a layer of solvent-free thermoplastic resinous varnish thereon and bonded thereto by a bond formed therebetween in the presence of solvent, and an exposed superimposed preformed sheet-like thermoplastic medium mounted on the solvent-free surface of said varnish and adhesively bonded thereto by a bond formed therebetween under the action of heat and in the absence of solvent, said thermoplastic medium being rubber hydrochloride and characterized by the fact that it is capable of softening under heat and pressure and is resilient and adherent when cold.

WILLIAM C. CALVERT.